United States Patent
Molloy et al.

(10) Patent No.: US 9,817,660 B2
(45) Date of Patent: *Nov. 14, 2017

(54) METHOD FOR REDUCING EXECUTION JITTER IN MULTI-CORE PROCESSORS WITHIN AN INFORMATION HANDLING SYSTEM

(71) Applicant: DELL PRODUCTS, L.P., Round Rock, TX (US)

(72) Inventors: Michael Karl Molloy, Silverthorne, CO (US); Mukund P. Khatri, Austin, TX (US); Robert W. Hormuth, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/724,626

(22) Filed: May 28, 2015

(65) Prior Publication Data

US 2015/0261527 A1 Sep. 17, 2015

Related U.S. Application Data

(63) Continuation of application No. 13/652,512, filed on Oct. 16, 2012, now Pat. No. 9,081,625.

(51) Int. Cl.
*G06F 9/50* (2006.01)
*G06F 9/22* (2006.01)

(52) U.S. Cl.
CPC .......... *G06F 9/223* (2013.01); *G06F 9/5094* (2013.01); *Y02B 60/142* (2013.01)

(58) Field of Classification Search
CPC .......... G06F 9/06; G06F 9/223; G06F 9/5094; G06F 9/5027; Y02B 60/142
See application file for complete search history.

(56) References Cited

U.S. PATENT DOCUMENTS

| 7,673,267 B1 | 3/2010 | Duong |
| 8,094,646 B2 | 1/2012 | Steinheider |
| 9,081,625 B2 | 7/2015 | Molloy |

(Continued)

OTHER PUBLICATIONS

International Bureau, International Application No. PCT/US2013/051951, International Search Report and Written Opinion dated Feb. 7, 2014.

(Continued)

*Primary Examiner* — Fahmida Rahman
(74) *Attorney, Agent, or Firm* — Isidore PLLC (57) ABSTRACT

A method of reducing execution jitter includes a processor having several cores and control logic that receives core configuration parameters. Control logic determines if a first set of cores are selected to be disabled. If none of the cores is selected to be disabled, the control logic determines if a second set of cores is selected to be jitter controlled. If the second set of cores is selected to be jitter controlled, the second set of cores is set to a first operating state. If the first set of cores is selected to be disabled, the control logic determines a second operating state for a third set of enabled cores. The control logic determines if the third set of enabled cores is jitter controlled, and if the third set of enabled cores is jitter controlled, the control logic sets the third set of enabled cores to the second operating state.

20 Claims, 6 Drawing Sheets

(56) References Cited

U.S. PATENT DOCUMENTS

| | | |
|---|---|---|
| 2004/0098518 A1 | 5/2004 | Beckett et al. |
| 2010/0199280 A1 | 8/2010 | Vestal et al. |
| 2010/0299541 A1 | 11/2010 | Ishikawa et al. |
| 2011/0072180 A1 | 3/2011 | Lee |
| 2011/0093638 A1 | 4/2011 | Divirgilio et al. |
| 2012/0159496 A1 | 6/2012 | Dighe et al. |
| 2013/0339977 A1* | 12/2013 | Dennis .................. G06F 9/5083 718/105 |
| 2014/0019793 A1 | 1/2014 | DeAmorim et al. |

OTHER PUBLICATIONS

International Bureau, International Application No. PCT/US13/051979, International Search and Written Opinion dated Jun. 12, 2015.

* cited by examiner

| NUMBER OF ENABLED CORES 602 | ENABLED CORE(S) 604 |
|---|---|
| 1 | 0 104 |
| 2 | 7 118 |
| 3 | 1 106 |
| 4 | 6 116 |
| 5 | 3 110 |
| 6 | 4 112 |
| 7 | 2 108 |
| 8 | 5 114 |

*FIG. 6*

METHOD FOR REDUCING EXECUTION JITTER IN MULTI-CORE PROCESSORS WITHIN AN INFORMATION HANDLING SYSTEM

RELATED APPLICATION

This application is a continuation of U.S. patent application Ser. No. 13/652,512 filed Oct. 16, 2012, which is fully incorporated herein by reference.

BACKGROUND

1. Technical Field

The present disclosure generally relates to operation of multi-core processors within an information handling system and in particular to reducing execution jitter in multi-core processors within an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system can be designed with one or more multi-core processors. A multi-core processor is a single computing component with two or more independent central processing units, processor cores, or cores that are able to read and execute program instructions or software code. The program instructions or software code can be regular computer instructions. The multiple cores can run multiple instructions at the same time, increasing the overall processing speed for programs. The multiple cores typically are integrated onto a single integrated circuit die or integrated circuit or onto multiple dies in a single chip package.

As processors with multiple cores implement higher and dynamic frequency ranges, these changes can result in non-deterministic code execution timing. Some software applications require very specific or deterministic code execution timing. Examples of these applications include real time applications, financial trading applications, and control applications. It is desirable for these applications to have predictable execution times. Execution jitter is defined as the difference in execution time for a given program or thread between the predicted execution time and the actual execution time at a given frequency. For example, if a given thread is predicted to execute in 10 milliseconds and some measured execution times are 8, 9, 11 and 13 milliseconds, the execution jitter is the difference between the measured times and 10 milliseconds. Execution jitter can occur for threads that execute in either longer or shorter times than the predicted or desired execution times. In order to control the level of execution jitter within an acceptable range, the multiple cores are forced to operate at the lowest operating frequency or lowest performance level. A method for reducing execution jitter in software programs running on multi-core processors is therefore needed.

BRIEF SUMMARY

Disclosed is a method for reducing execution jitter in a processing environment that includes a processor having several cores and control logic that receives core configuration data. The control logic determines if a first set of cores are to be disabled. If none of the first set of cores is to be disabled, the control logic determines if a second set of cores are to be jitter controlled. If the second set of cores are to be jitter controlled, the second set of cores are set to a first operating state. If the first set of cores are to be disabled, the first set of cores are disabled based upon physical location, and the control logic determines a second operating state for a third set of one or more enabled cores. The control logic determines if the third set of enabled cores are to be jitter controlled, and if the third set of enabled cores are jitter controlled, the control logic sets the third set of enabled cores to the second operating state determined by the number of disabled cores. The method provides consistent execution times for threads running on multiple cores.

A multi-core processor is disclosed that includes a plurality of cores in communication with control logic having firmware executing thereon. The firmware configures the control logic to receive at least one core configuration parameter and to determine from the at least one configuration parameter if a first set of one or more cores is selected to be disabled. In response to none of the first set of cores selected to be disabled, the control logic determines if a second set of one or more cores is selected to be jitter controlled. In response to the second set of the cores being selected to be jitter controlled, the control logic sets the second set of cores to a first operating state that reduces jitter. In response to the first set of cores being selected to be disabled, the control logic disables the first set of cores and determines a second operating state that reduces jitter for a third set of one or more enabled cores that are enabled for turbo state operation. The control logic determines if the third set of enabled cores are selected to be jitter controlled and, in response to the third set of enabled cores selected to be jitter controlled, the control logic sets the third set of enabled cores to the second operating state that reduces jitter.

Also disclosed is an information handling system (IHS) that comprises a processor having a plurality of cores and control logic. A memory is coupled to the processor via a system interconnect. The control logic has firmware executing thereon to reduce execution jitter. The firmware configures the control logic to determine if a first set of cores are to be disabled, and in response to none of the cores being selected for disabling, the control logic determines if a second set of cores are to be jitter controlled. In response to the second set of the cores being jitter controlled, the control logic sets the second set of cores to a first operating state. In response to the first set of cores being selected for disabling, the first set of cores are disabled based upon physical location, and the control logic determines a second operating state for a third set of one or more enabled cores that are enabled for turbo state operation. The control logic determines if the third set of enabled cores are to be jitter controlled; and in response to the third set of enabled cores being jitter controlled, the third set of enabled cores are set to the second operating state determined by the number of disabled cores. The information handling system provides consistent execution times for threads running on multiple cores.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an information handling system (IHS), a multi-core processor and a method performed within the information handling system for (1) reducing execution jitter in multi-core processors, (2) enabling one or more processor cores within a multi-core processor to operate at a pre-determined frequency and (3) providing consistent execution times for threads running on multiple cores within a multi-core processor.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
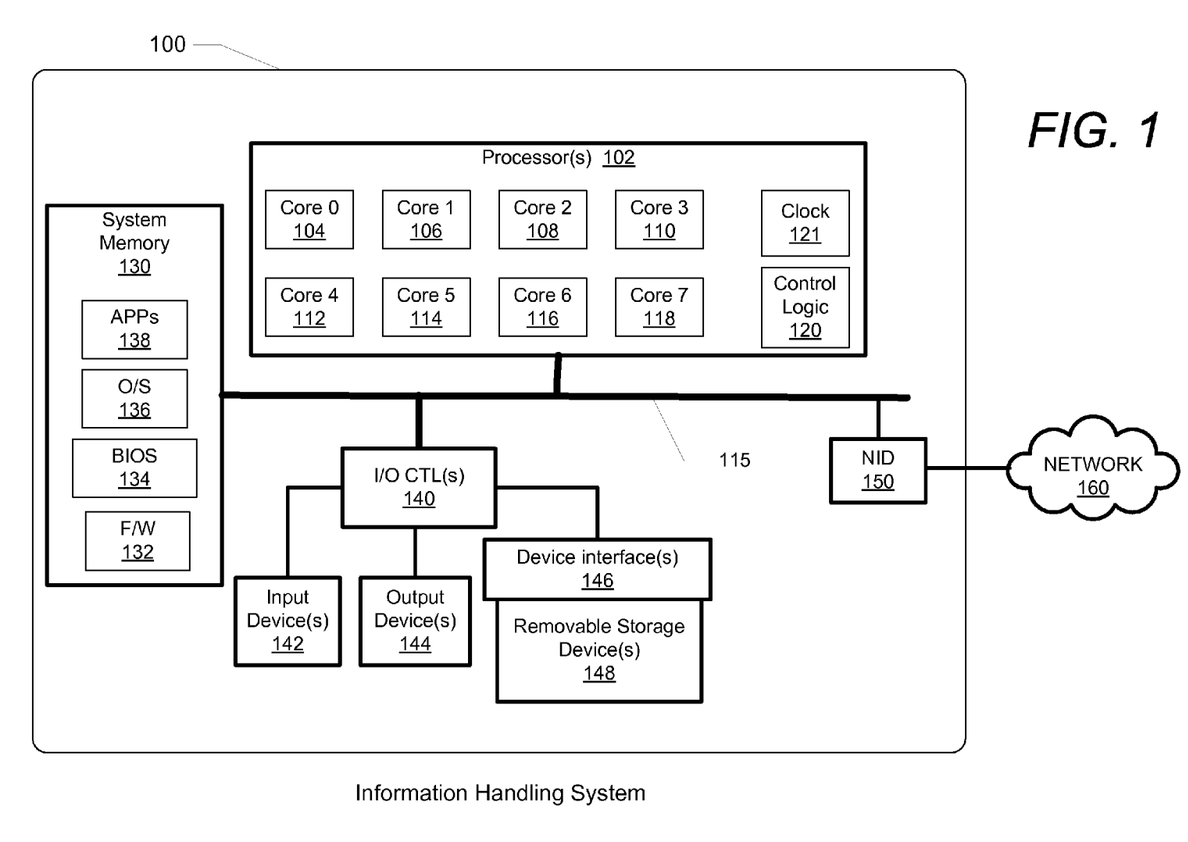
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 130 via system interconnect 115. System interconnect 115 can be interchangeably referred to as a system bus, in one or more embodiments. System memory 130 can include therein a plurality of software and/or firmware modules including firmware (F/W) 132, basic input/output system (BIOS) 134, operating system (O/S) 136, and application(s) 138. The one or more software and/or firmware modules within system memory 130 can be loaded into processor(s) 102 during operation of IHS 100.

Processor(s) 102 include several processor cores, including core 0 104, core 1 106, core 2 108, core 3 110, core 4 112, core 5 114, core 6 116 and core 7 118. Cores 104-118 can communicate with each other and with control logic 120. Control logic 120 can control the operation of cores 104-118. According to one aspect of the described embodiments, control logic 120 can control the operating frequency and voltage or operating state of cores 104-118. Control logic 120 can also receive software and/or firmware modules from system memory 130 during the operation of processor(s) 102. In one embodiment, clock 121 is provided on processor(s) 102 and enables the generation of several different periodic frequency signals that can be applied to one or more of the cores 104-118 within processor(s) 102.

IHS 100 further includes one or more input/output (I/O) controllers 140 which support connection by, and processing of signals from, one or more connected input device(s) 142, such as a keyboard, mouse, touch screen, or microphone. I/O controllers 140 also support connection to and forwarding of output signals to one or more connected output devices 144, such as a monitor or display device or audio speaker(s). Additionally, in one or more embodiments, one or more device interfaces 146, such as an optical reader, a universal serial bus (USB), a card reader, Personal Computer Memory Card International Association (PCMCIA) slot, and/or a high-definition multimedia interface (HDMI), can be associated with IHS 100. Device interface(s) 146 can be utilized to enable data to be read from or stored to corresponding removable storage device(s) 148, such as a compact disk (CD), digital video disk (DVD), flash drive, or flash memory card. Device interfaces 146 can further include General Purpose I/O interfaces such as I²C, SMBus, and peripheral component interconnect (PCI) buses.

IHS 100 comprises a network interface device (NID) 150. NID 150 enables IHS 100 to communicate and/or interface with other devices, services, and components that are located external to IHS 100. These devices, services, and components can interface with IHS 100 via an external network, such as example network 160, using one or more communication protocols. Network 160 can be a local area network, wide area network, personal area network, and the like, and the connection to and/or between network and IHS 100 can be wired or wireless or a combination thereof. For purposes of discussion, network 160 is indicated as a single collective component for simplicity. However, it is appreciated that network 160 can comprise one or more direct connections to other devices as well as a more complex set of interconnections as can exist within a wide area network, such as the Internet.

Those of ordinary skill in the art will appreciate that the hardware components and basic configuration depicted in FIG. 1 and described herein may vary. For example, the illustrative components within IHS 100 are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 2:
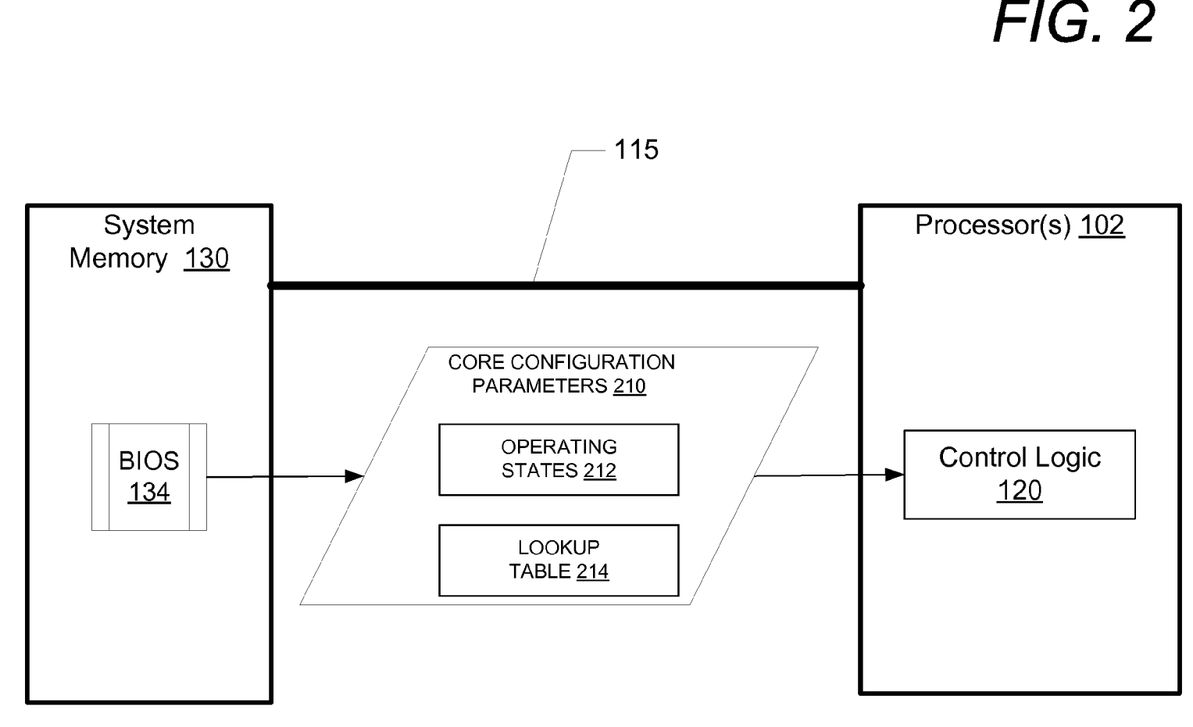
FIG. 2 illustrates an example of core configuration parameters being transmitted from the basic input output system (BIOS) to the processor control logic in accordance with one or more embodiments.

With reference now to FIG. 2, there is illustrated one embodiment of core configuration parameters 210 being transmitted from the basic input output system (BIOS) 134 to the processor control logic 120. In the discussion of FIG. 2, reference is also made to components illustrated in FIG. 1. During the initial startup of IHS 100 and processor(s) 102, core configuration parameters 210 are transmitted from the BIOS 134 to the processor control logic 120. The core configuration parameters 210 include operating states 212 for the cores 104-118. According to one aspect of the disclosure, examples of these operating states 212 include (a) identification of one or more cores selected to be enabled for operation at frequencies equal to or higher than the minimum clock frequency or core operating frequency and (b) an identification of specific cores selected to be disabled, such that the disabled cores are not operational. The operating states 212 identifies which of the one or more of cores 104-118 are to be selected to be disabled and/or enabled and identifies which of the one or more cores 104-118 are to be controlled for execution jitter. Operating frequencies that are higher than the minimum core operating frequency are referred to as turbo states. For example, if the normal or minimum core operating frequency is 2.0 GHz, operating states 212 can be set or pre-determined by a user such that one or more cores 104-118 operate at higher core frequencies such as 2.5 GHz, 3.0 GHz, 3.5 GHz, 4.0 GHz or other frequencies. The maximum core frequency is subject to on-chip limits in temperature, current, and power consumption. In one or more embodiments, the core configuration parameters 210 also include an ordered lookup table 214 of the cores, in which the cores are ordered by the maximum physical distance separating each core on the chip or die. For example, as shown in FIG. 1, core 0 104 is physically located further away from core 7 118 than from core 4 112. Ordered lookup table 214 is used to select one or more cores 104-118 for operation.

The core configuration parameters 210 can be pre-determined by a user and stored in (BIOS) 134. For example, operating states 212 can direct four of the cores 104-118 (e.g., core 0-core 3) to be disabled from operating and another (i.e., different) four of the cores 104-118 (e.g., core 4-core 7) to be enabled for operation and thus operate at a higher core operating frequency.

Figure 3:
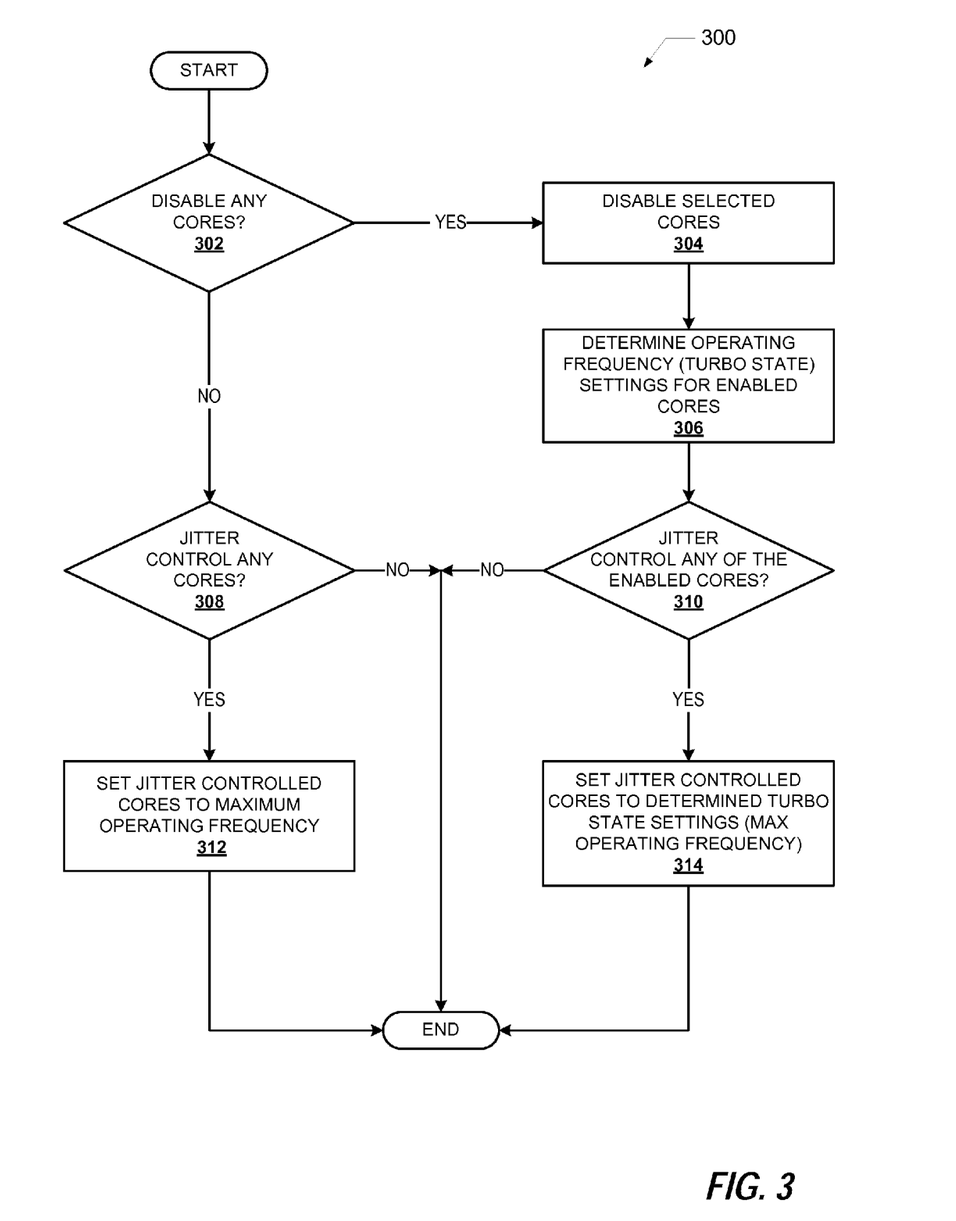
FIG. 3 is a flow chart illustrating one example of the method by which cores are disabled and/or enabled for (a) operation and (b) jitter control, according to one or more embodiments.

FIG. 3 illustrates a flowchart of exemplary methods by which cores are (a) disabled and enabled for operation and by which (b) cores are controlled for reducing execution jitter. Generally, method 300 represents a computer-implemented method to reduce execution jitter in multi-core processors and to enable cores to be operated at higher operating frequencies. In the discussion of FIG. 3, reference is also made to components illustrated in FIG. 1 and FIG. 2. According to one aspect of the disclosure, disabled cores do not perform execution of instructions and do not generate heat, while enabled cores operate at a higher frequency that is variable depending upon processor workloads and other factors that are internal to and based on the design of the processors. Jitter controlled cores are set to a pre-determined clock frequency as can be specified by a user. And, different jitter controlled cores can have different clock frequencies.

Method 300 begins at the start block and proceeds to block 302 at which control logic 120 determines if any of the cores 104-118 are to be disabled from operation. Disabled cores are identified through the use of core configuration parameters 210 received from BIOS 134. Disabled cores do not operate and thus do not execute any instructions. According to one embodiment, the minimum core operating frequency is the default or reference operating frequency for the cores. In response to none of the cores 104-118 being selected to be disabled, control logic 120 determines if any of cores 104-118 are to be jitter controlled (block 308). In response to none of the cores 104-118 being selected to be jitter controlled, method 300 ends. In response to one or more of the cores 104-118 being selected to be jitter controlled, the one or more cores selected for jitter control are set by control logic 120 to operate at a maximum operating frequency that is dependent on the number of cores in operation (312). In one embodiment, control logic 120 sets the maximum operating frequency based upon the pre-determined operating states 212. In another embodiment, control logic 120 sets the maximum operating frequency of the jitter controlled cores to the reference frequency or minimum core operating frequency. Method 300 then terminates at the end block.

In response to one or more of the cores 104-118 being requested or selected to be disabled in block 302, control logic 120 disables the selected cores from operating at block 304 and determines the core operating frequency or turbo states for the enabled cores (306). Control logic 120 determines if any of the enabled cores are to be jitter controlled (310). In response to none of the enabled cores being selected to be jitter controlled, method 300 ends. At block 314, in response to one or more of the enabled cores being selected to be jitter controlled, control logic 120 sets or locks the cores selected for jitter control to operate at a maximum operating frequency or turbo state previously determined at block 306. Method 300 then terminates at the end block.

Method 300 allows a set of instructions or threads to execute across multiple cores that provide both fast execution times and consistent execution times (i.e., no jitter). Execution jitter is defined as the difference in execution time for a given program or thread between the predicted execution time and the actual execution time at a given frequency. With a set of one or more cores 104-118 (e.g., core 4-core 7) fixed to operate at a pre-determined operating frequency, the predicted execution time and the actual execution time will be the same, resulting in no execution jitter. For example, if the highest clock frequency that a set of instructions or threads executing with consistent execution times (no jitter) on multiple cores is 3.5 GHz, method 300 can set or restrict two or more of the cores 104-118 to operate at 3.5 GHz.

Figure 4:
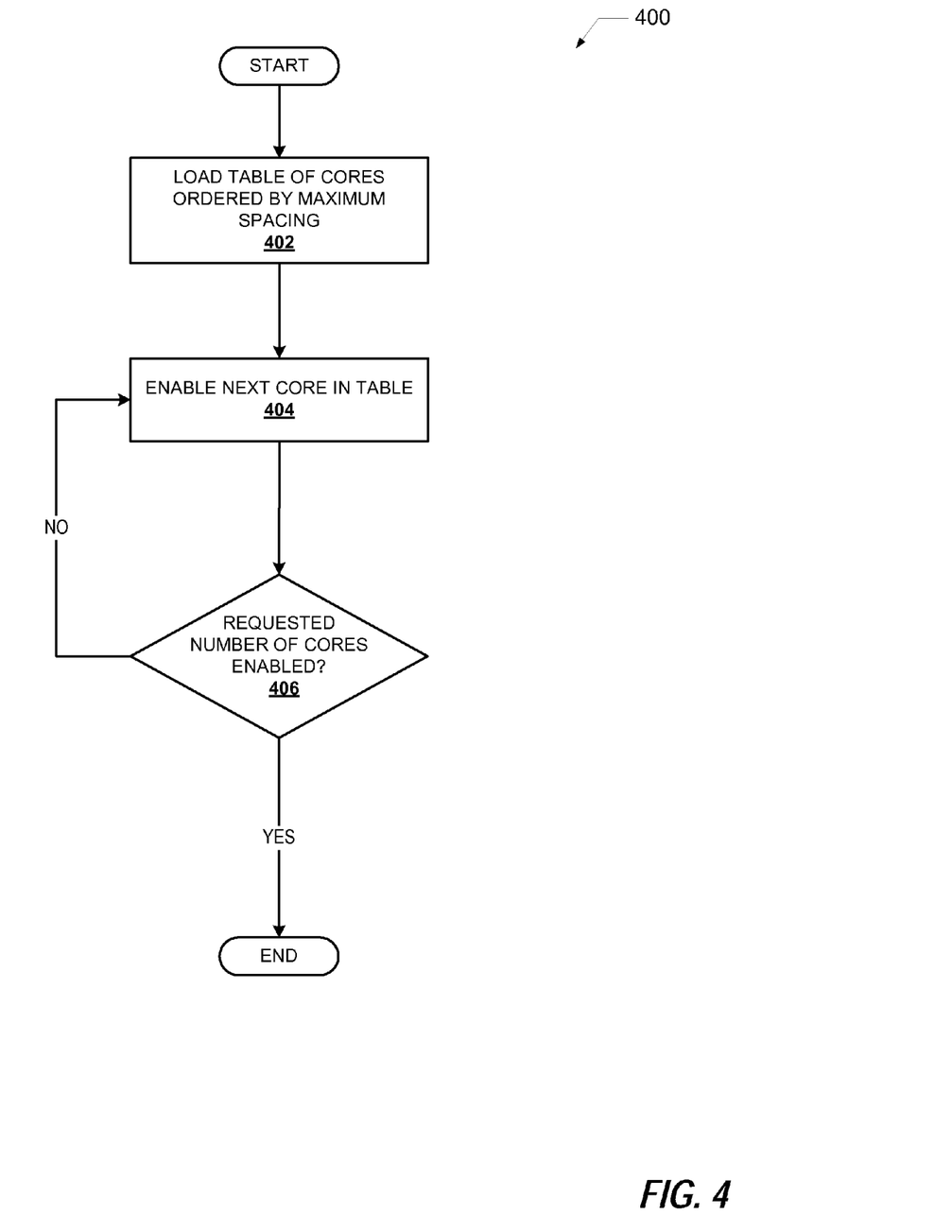
FIG. 4 is a flow chart illustrating one example of the method by which cores are disabled, according to one or more embodiments.

Turning now to FIG. 4, a flow chart of a method 400 by which cores are enabled is shown. In the discussion of FIG. 4, reference is also made to components illustrated in FIG. 1 and FIG. 2. Method 400 begins at the start block and proceeds to block 402 where the lookup table 214 is loaded into control logic 120. Lookup table 214 contains an ordered table of the cores 104-118 ordered by the maximum physical distance or spacing on the chip or die (see, for example, maximum separation distance between core 0 104 and core 7 118 within processor(s) 102 of FIG. 1). Control logic 120 enables a first one of cores 104-118 (e.g., core 0 104) for operation in the order defined by lookup table 214 (block 404). At block 406, control logic 120 determines if the requested or selected number of cores have been enabled for operation. According to one aspect of the disclosure, the number of cores selected to be enabled for operation are determined by core configuration parameters 210 received from BIOS 134. In response to the selected number of cores being enabled, method 400 ends. In response to the selected number of cores not being enabled, method 400 returns to block 404 where control logic 120 enables the next core for turbo state operation in the order defined by lookup table 214.

Figure 5:
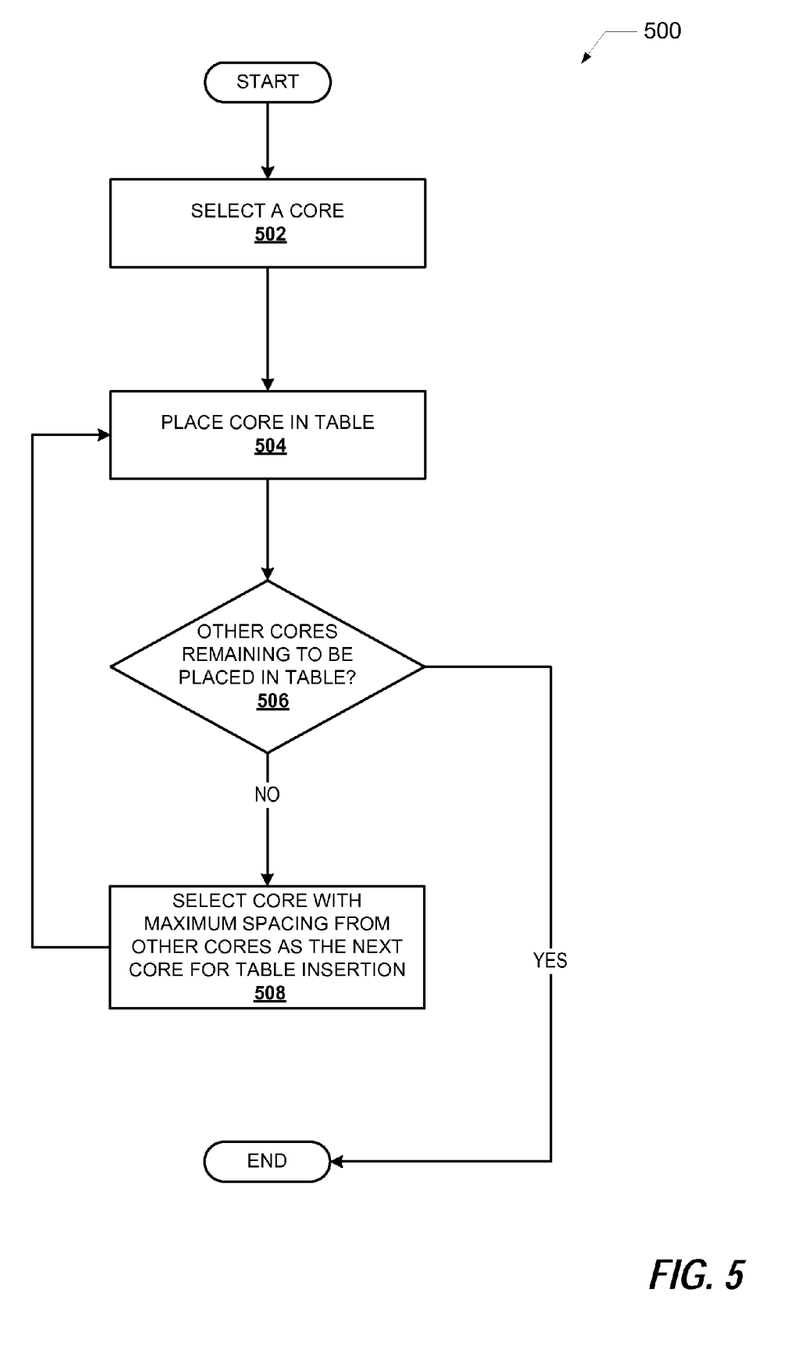
FIG. 5 is a flow chart illustrating one example of the method by which an ordered lookup table is generated, according to one or more embodiments.

FIG. 5 illustrates a flow chart of a method 500 for generating an ordered lookup table 214. In the discussion of FIG. 5, reference is also made to components illustrated in FIG. 1 and FIG. 2. Method 500 begins at the start block and proceeds to block 502 where one of the cores 104-118 is selected by control logic 120. The selected core is placed into the lookup table 214 (block 504). At decision block 506, control logic 120 determines if all of the required cores 104-118 have been placed into the lookup table 214. In response to all of the cores being placed into the lookup table 214, method 500 terminates. In response to there being other cores remaining to be placed into the lookup table 214, control logic 120 selects (at block 508) the next core with maximum physical spacing distance from the previously selected core(s) in the processor (e.g., processor(s) 102, FIG. 1), and control logic 120 places the selected next core into the lookup table 214 (block 504). According to one aspect, the next core with maximum physical spacing distance is selected from among the other non-selected cores (i.e., cores that are not yet placed in the lookup table).

Figure 6:
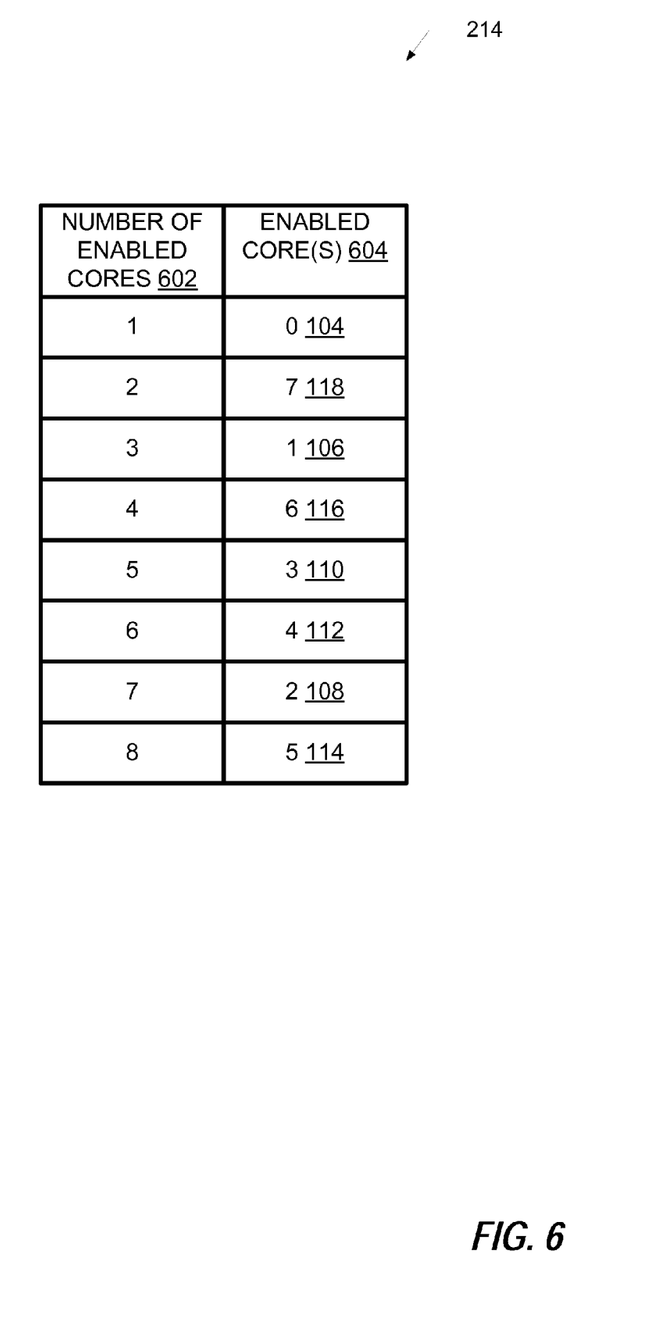
FIG. 6 is an example ordered lookup table identifying the sequence of enabling the cores based on the total number of enabled cores, according to one embodiment.

Referring to FIG. 6, one embodiment of an ordered lookup table 214 presenting an increasing number of enabled cores and the corresponding enabled cores (at maximum physical spacing distance) generated by method 500 of FIG. 5 is shown. Ordered lookup table 214 is based on the cores with maximum physical spacing from each other. In the discussion of FIG. 6, reference is also made to components illustrated in FIG. 1 and FIG. 2. Lookup table 214 includes a first column, number of enabled cores 602, indicating the different number of cores than can be enabled, and a second column, enabled core(s) 604, identifying the specific core(s) that is enabled as the number of cores that are enabled increases. For example, if one core is to be enabled for operation at a frequency higher than the regular or minimum core operating frequency, then the only core enabled can be core 0 104. If three cores are to be enabled for operation at a frequency higher than the default or minimum core operating frequency, then the cores enabled are the cores with the maximum separation distance beginning with core 0 104 (e.g., core 0 104, core 7 118 and core 1 106 in FIG. 1). If five cores are to be enabled for operation at a frequency higher than the regular or minimum core operating frequency, then the cores and sequence of cores that are enabled within processor 102 of FIG. 1 are core 0 104, core 7 118, core 1 106, core 6 116, and core 3 110.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

With the above described systems, computer program products and methods, aspects of the disclosure provide the functionality of reducing execution jitter in multi-core processors within an information handling system and to selectively enabling one or more processor cores to operate at a pre-determined frequency.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method of reducing execution jitter within a processor having control logic and a plurality of individual cores, the method comprising:
   determining from at least one configuration parameter if a first set of one or more cores is selected to be disabled from operation, the plurality of individual cores being configurable as a first set, a second set, and a third set of one or more cores, each set being selectably enabled or disabled, and each set being configurable in at least an operating state that reduces jitter, the operating state being in part based on a number of disabled cores;
   in response to the first set of cores being selected to be disabled, disabling the first set of cores and determining an operating state that reduces jitter for the third set of one or more enabled cores, while the first set of one or more cores are disabled;
   determining if the third set of enabled cores are selected to be jitter controlled;
   in response to the third set of enabled cores being selected to be jitter controlled, setting the third set of enabled cores to the operating state that reduces jitter;
   in response to the first set of cores not being selected to be disabled, determining if a second set of one or more cores are selected to be jitter controlled; and
   in response to the second set of cores being selected to be jitter controlled, setting the second set of cores to a next operating state that reduces jitter.

2. The method of claim 1, wherein the core configuration parameter comprises an ordered lookup table of the third set of enabled cores.

3. The method of claim 1, further comprising:
   receiving the core configuration parameter from a basic input output system stored in memory; and
   loading the core configuration parameter into the control logic.

4. The method of claim 1, wherein the next operating state comprises a first operating frequency for the second set of cores and the operating state comprises a second operating frequency for the third set of cores.

5. The method of claim 1, wherein the disabled cores do not operate and are selected to be disabled based on a physical location of each core.

6. The method of claim 1, further comprising:
determining a third operating state for a fourth set of enabled cores;
determining if the fourth set of enabled cores are selected to be jitter controlled; and
in response to the fourth set of enabled cores selected to be jitter controlled, setting the fourth set of enabled cores to the third operating state.

7. The method of claim 1, further comprising:
loading, into the control logic, an ordered lookup table of the cores ordered by maximum physical spacing between each pair of sequentially enabled cores among a sequence of enabled cores;
enabling operation of a first core in the ordered lookup table;
determining if all of the third set of enabled cores have been enabled for operation; and
in response to all of the third set of enabled cores not being enabled, enabling operation of a next sequential core in the ordered lookup table.

8. The method of claim 1, further comprising:
selecting a first core of the plurality of cores;
placing the first core in a first position in an ordered lookup table;
determining if all of the cores have been placed in the lookup table; and
in response to all of the cores not having been placed in the table, selecting a second core with maximum spacing from the other cores that are not yet selected for the table and placing the selected second core in a next sequential position in the ordered lookup table.

9. A multi-core processor comprising:
a plurality of cores grouped as a first set, a second set, and a third set of one or more cores, each set being selectably enabled or disabled, and each set being configurable in at least one operating state that is based on a number of disabled cores; and
control logic in communication with the plurality of cores and having firmware executing thereon, wherein the firmware configures the control logic to:
determine from at least one configuration parameter if a first set of one or more cores are selected to be disabled from operation;
in response to the first set of cores being selected to be disabled, disable the first set of cores from operation based on a physical location of each core and determine an operating state that reduces jitter for a third set of one or more enabled cores, while the first set of one or more cores are disabled;
determine if the third set of enabled cores are selected to be jitter controlled;
in response to the third set of enabled cores being selected to be jitter controlled, set the third set of enabled cores to the operating state that reduces jitter;
in response to none of the first set of cores being selected to be disabled, determines if a second set of one or more cores are selected to be jitter controlled; and
in response to the second set of the cores being selected to be jitter controlled, set the second set of cores to another operating state that reduces jitter.

10. The multi-core processor of claim 9, further comprising logic that:
receives the at least one core configuration parameter in a basic input output system memory; and
loads the core configuration parameter into the control logic; and
wherein the core configuration parameter comprises an ordered lookup table of the third set of enabled cores.

11. The multi-core processor of claim 9, wherein the other operating state comprises a first operating frequency for the second set of cores and the operating state comprises a second operating frequency for the third set of cores, and wherein the operating state is based on the number of disabled cores.

12. The multi-core processor of claim 9, further comprising logic that:
determines a third operating state for a fourth set of enabled cores;
determines if the fourth set of enabled cores are selected to be jitter controlled; and
in response to the fourth set of enabled cores selected to be jitter controlled, sets the fourth set of enabled cores to the third operating state.

13. The multi-core processor of claim 9, further comprising logic that:
loads an ordered lookup table of the cores ordered by maximum spacing into the control logic;
enables a first core in the ordered lookup table;
determines if all of the third set of enabled cores have been enabled for operation; and
in response to all of the third set of enabled cores not being enabled, enables a subsequent second core in the ordered lookup table.

14. The multi-core processor of claim 9, further comprising logic that:
selects a first core of the plurality of cores;
places the first core in a first position in an ordered lookup table;
determines if all of the cores have been placed in the lookup table; and
in response to all of the cores not having been placed in the table, selects a second core with maximum spacing from the other cores and placing the selected second core in a second position in the ordered lookup table.

15. An information handling system comprising:
a processor having a plurality of cores and a control logic, the plurality of cores grouped as a first set, a second set, and a third set of one or more cores, each set being selectably enabled or disabled;
a memory coupled to the processor via a system interconnect;
the control logic having firmware executing thereon to reduce execution jitter, wherein the firmware configures the control logic to:
determine from at least one configuration parameter if the first set of one or more cores are selected to be disabled from operation;
in response to none of the first set of cores being selected to be disabled, determine if the second set of one or more cores are selected to be jitter controlled;
in response to the second set of the cores being selected to be jitter controlled, set the second set of cores to a first operating state that reduces jitter; and
in response to the first set of cores being selected to be disabled, disable the first set of cores from operation and determine a second operating state that reduces jitter for the third set of one or more enabled cores.

16. The information handling system of claim 15, wherein the firmware further configures the control logic to:
- determine if the third set of enabled cores are selected to be jitter controlled; and
- in response to the third set of enabled cores being selected to be jitter controlled, set the third set of enabled cores to the second operating state that reduces jitter.

17. The information handling system of claim 16, wherein:
- the control logic further receives the at least one core configuration parameter that includes an ordered lookup table of the third set of enabled cores; and
- the first operating state comprises a first operating frequency for the second set of cores and the second operating state comprises a second operating frequency for the third set of cores, and wherein the second operating state is based on the number of disabled cores.

18. The information handling system of claim 16, wherein the control logic:
- determines a third operating state for a fourth set of enabled cores;
- determines if the fourth set of enabled cores are selected to be jitter controlled; and
- in response to the fourth set of enabled cores being selected to be jitter controlled, sets the fourth set of enabled cores to the third operating state.

19. The information handling system of claim 16, wherein the control logic:
- loads an ordered lookup table of the cores ordered by maximum spacing into the control logic;
- enables a first core in the ordered lookup table;
- determines if all of the third set of enabled cores have been enabled for operation; and
- in response to all of the third set of cores not being enabled, enables a subsequent second core in the ordered lookup table.

20. The information handling system of claim 17, wherein the control logic:
- selects a first core of the plurality of cores;
- places the first core in a first position in an ordered lookup table;
- determines if all of the cores have been placed in the lookup table; and
- in response to all of the cores not having been placed in the table, selects a second core with maximum spacing from the other cores and placing the selected second core in a second position in the ordered lookup table.

* * * * *